(No Model.)  3 Sheets—Sheet 2.
A. C. BURGHARDT.
FIRE ESCAPE.
No. 284,180.  Patented Sept. 4, 1883.
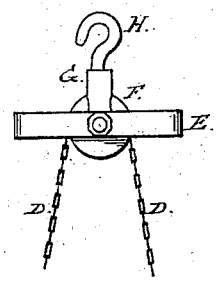
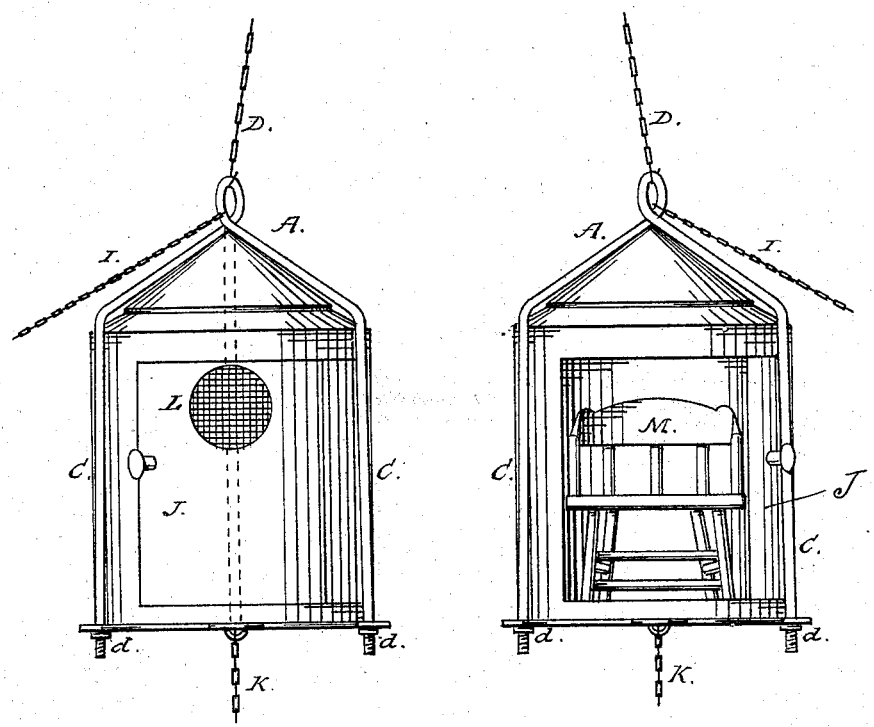
Attest:
F. W. Howard
E. P. Hough
Inventor:
August Conrad Burghardt
By Chas. J. Gooch
Attorney.

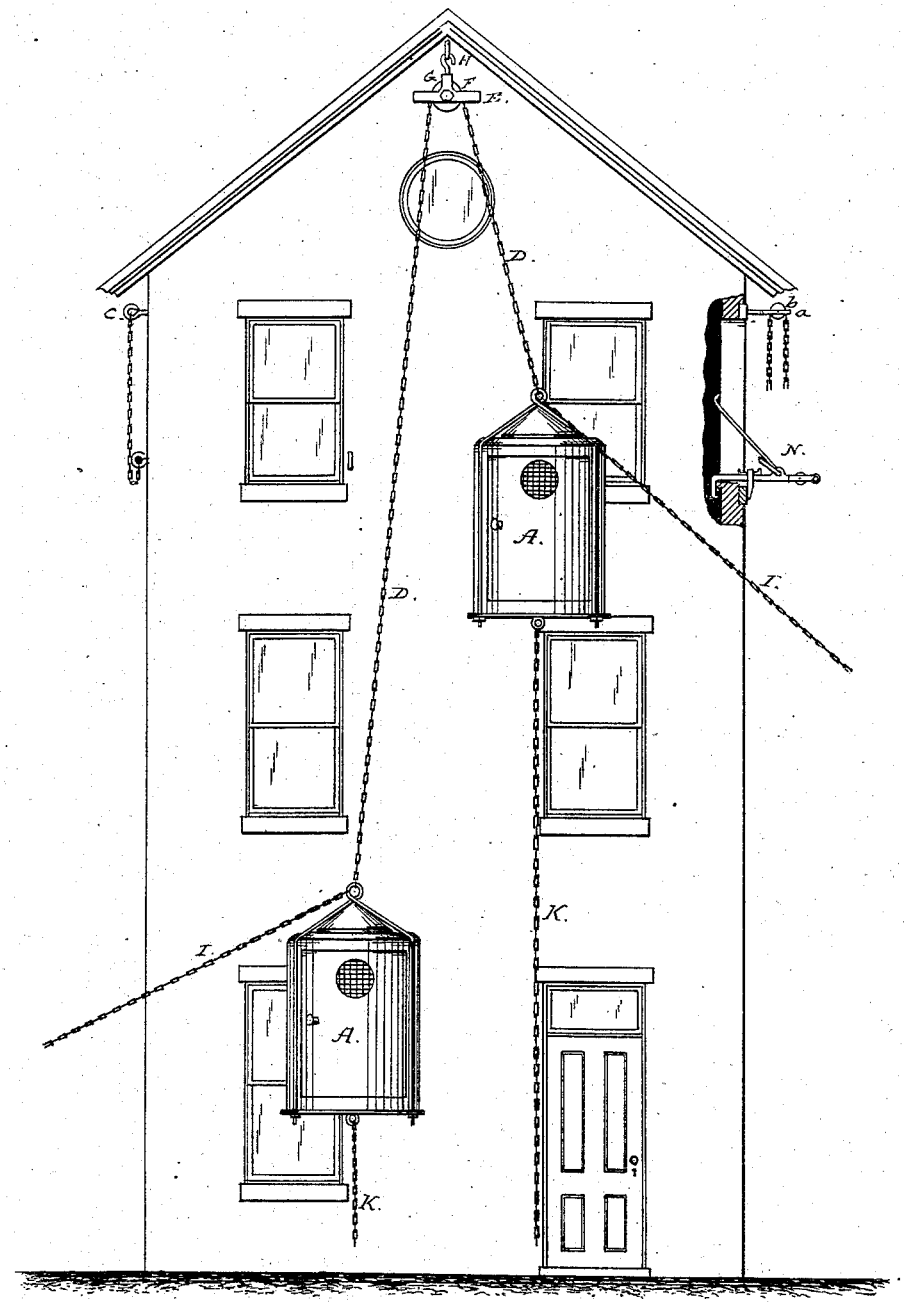

(No Model.) 3 Sheets—Sheet 3.
A. C. BURGHARDT.
FIRE ESCAPE.
No. 284,180. Patented Sept. 4, 1883.
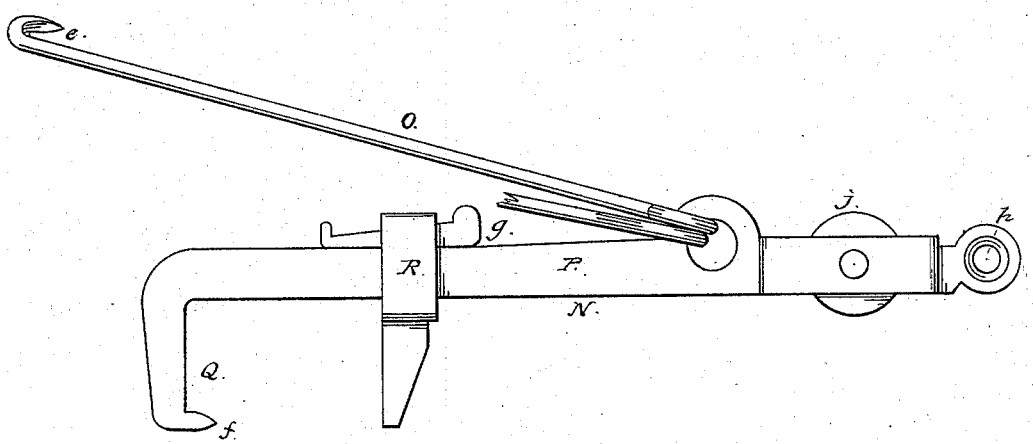
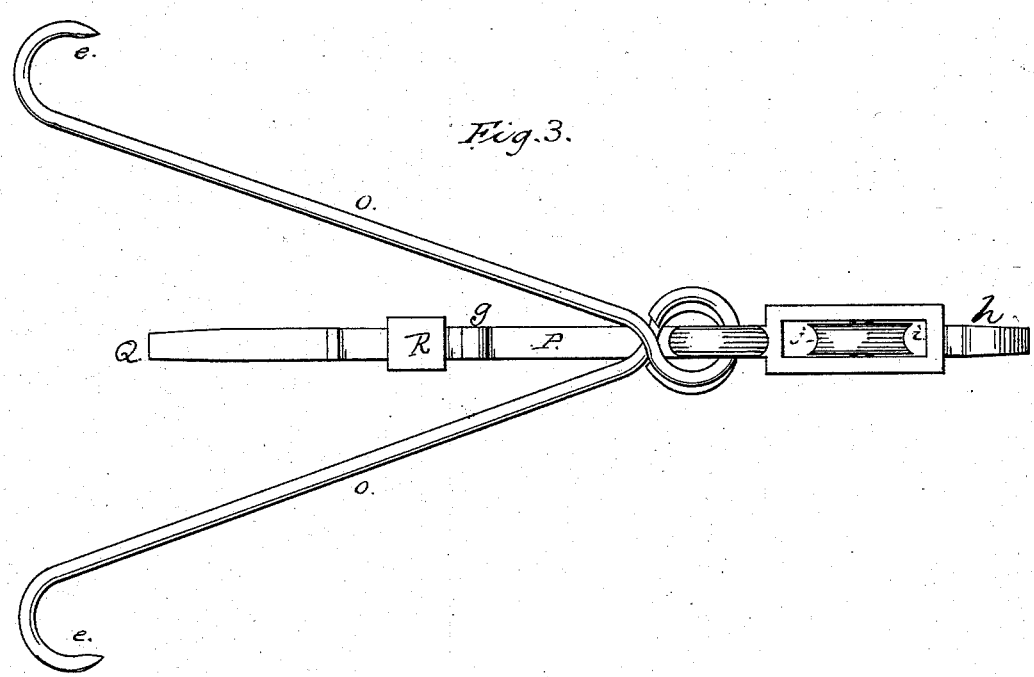
Fig.3.
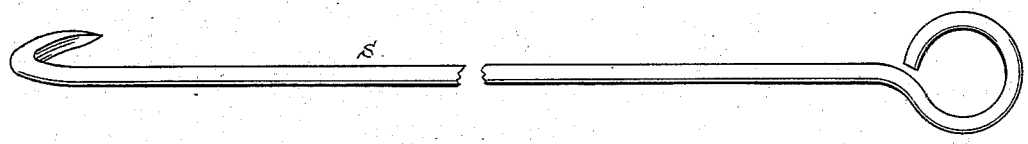
Attest;
F. W. Howard
E. P. Hough
Inventor;
August Conrad Burghardt
By Chas. J. Gooch
attorney.

UNITED STATES PATENT OFFICE.

AUGUST CONRAD BURGHARDT, OF PORT DEPOSIT, MARYLAND.

FIRE-ESCAPE.

SPECIFICATION forming part of Letters Patent No. 284,180, dated September 4, 1883.

Application filed April 4, 1883. (No model.)

*To all whom it may concern:*

Be it known that I, AUGUST CONRAD BURGHARDT, a citizen of the United States of America, residing at Port Deposit, in the county of Cecil and State of Maryland, have invented certain new and useful Improvements in Fire-Escapes, of which the following is a specification, reference being had therein to the accompanying drawings.

This invention relates to certain improvements in fire-escapes, by means of which the same is rendered very portable, easily placed and secured in position, easily and effectively operated, and complete protection afforded the user; and the invention consists, essentially, in a pair of metallic cages closed at top, bottom, and sides, and each provided with a sliding door having a gauze-covered opening, and in its interior with one or more seats, upon which the occupants may rest while being lowered from the burning building, a chain attached at each end to the upper part of and connecting said cages together, two or more guiding-chains, each connected at one end to one cage and having its free end depending, so as to be grasped by persons in the street, a link having a pivotal hook and a sheave or roller, an adjustable grapple and cage-support for attachment to a window-frame, and in other details of construction, as hereinafter described and claimed.

In the drawings, Figure 1 represents in elevation one side of a house having my improvements applied thereto. Fig. 2 represents in side elevation the said cages and attachments, one with the door open and the other showing the door closed. Fig. 3 represents in detail the adjustable grapple and cage-support.

A represents my improved cages, of which there are two, as shown. These cages are shown as of cylindrical shape; but they may be of any other desired form. They are made of any suitable metal or material capable of resisting the action of the flames passing out of the burning building, thereby fully protecting the occupant from the flames and heat during their use.

B represents braces on the bottom, through whose outwardly-projecting ends pass the lower ends of rods C, said rods being screw-threaded at their lower ends and secured to said braces by nuts $d$. These rods extend upward to and across the apex of the cage, where they are bent into eye form, as shown, and to these eyes are attached the ends of a chain, D, by which the two cages are coupled together, the length of such coupling-chain being sufficiently great to admit of the cages assuming the positions shown in Fig. 1.

E represents a link, within which is journaled a sheave or pulley, F. A lug or ear, G, extends upwardly from this link, within which is pivotally secured a hook, H. To any convenient position, either at the top or side of each cage, is attached one end of a chain, I, the free end of which depends, so as to be within ready reach of either persons in the street or in opposite houses. By pulling upon this chain I in an angular or in a horizontal direction the cage to which it is attached will be pulled away from the burning building, and thus removed from the path of the flames—a very desirable result in many instances, especially where the flames are of great volume and the heat intense. Another function of the said chain is that if for any purpose it is desired to turn either cage partly around while suspended, which would be the case should that part having the door J become twisted around out of convenient access to a person desiring to use it, by pulling upon the chain I in the direction it is desired that said cage shall assume the cage can be pulled around, the chain connecting the cages and the link thereon turning around upon the swiveled hook.

K K represent two chains, each attached at one end to the bottom of the cage, their free ends depending, so as to be grasped by persons in the street. The function of these chains K is to regulate the speed at which the cage shall be allowed to descend. When a person is within the suspended cage, if no check or brake is employed, said cage would descend very rapidly, until finally it would fall to the ground with force enough to at least seriously injure the occupant; but by my arrangement as soon as one cage is ready to descend the free end of the chain K, attached to the empty cage, is grasped by parties below and gradually paid out, so that the descent of the loaded cage shall be gradual and without jerking or sudden shocks. Should both the cages be at their lowest position—that is, on or near the ground—either one may be raised to the desired height by pulling down upon the other cage and the connecting-chain.

The door J is preferably arranged to slide around within the cage, as shown; but it may be arranged to open outwardly, if desired.

L represents a gauze-covered opening in said door for the purpose of ventilating the cage.

M represents a chair or other seating accommodation within the cage, upon which the occupant may rest while being lowered. The construction and arrangement of these cages especially adapts them for use in lowering invalids, children, and others, as they can be comfortably and safely seated while being so lowered. There is no danger of their falling out after the door is closed, they are entirely protected from the flames and heat, they are not liable to be bruised, stifled, or injured, and they can at all times be safely and expeditiously lowered.

N represents the grapple and support for the cages and their operative mechanism. This grapple is composed of two arms, O O, attached at their outer ends to the bar P by hook-and-link connection, or in any other suitable manner. Their inner ends are provided with a barb or hook, e, which are hooked within or to the inside of the framing of the window, as shown, by which means the bar P is supported and held rigidly in position. The inner end of this bar P has a hook, Q, having inturned end f. This hooked end is designed to be made of a depth corresponding with the depth of the window-sills, and in practice is placed across and the end f thereof driven into the same, so as to secure a firm hold.

R represents a dog, slotted at it upper end, so as to readily slide along the bar P. A wedge, g, is inserted within the slotted part of this dog, and between it and the top of the bar P, so that when the grapple is placed in position said dog is slid in against the outer sill and the wedge driven in tightly, so as to grip said dog, and thus securely connect the bar to the window-sill. By this hook-and-dog connection, aided by the grappling-hooks O e, the combined grapple and support is rigidly held in position, and will admit of great weight and pressure being brought to bear on the outer end of the bar without displacing or loosening the same.

The outer end of the bar P is provided with an eye, h, within which the hook H may be inserted. Rearwardly of this eye h the bar P is provided with a slot, i, within which is journaled a sheave or roller, j. The chain connecting the two cages may, if desired, be passed around this sheave and rotate thereon, thus dispensing with the hook H. The slot i is longer than the width of the sheave, in order that should the eye h become broken, or if for any reason it is not desired to use the same, the hook H may be inserted within such slot.

Below the eaves of the house or other building, at any suitable position relatively to the windows, and at either or all sides thereof, I attach either a slotted bracket, a, having a sheave or roller, b, journaled in its outer ends, or simple eyed rods c, as found most convenient. When the sheaved bracket is employed, a chain may be passed through said bracket, and its free ends joined and secured in any convenient position to be within ready access from the windows. Then when such a chain is employed, and it is desired to use the same, the lower end is freed and the hook H hooked therein. The cages can then be operated in the manner hereinbefore described; or said hook may be hooked within either the eyes of either of the rods c, or within that portion of the slotted bracket not occupied by the sheave or roller b, as desired.

Either or all of the devices herein described, to which the hook on the cage-connecting chain may be attached, may be attached to the building in any desired number of places and positions thereon, in order that the cages may be applied and operated from either front, back, or sides thereof, and from either floor, such arrangement of said eyes or brackets as is desired being left to the judgment and the exigencies of each particular case; but the method in which I prefer to use my improved escape is by attaching the grapple and support to the window sill and frame in the manner heretofore described, and then hooking the link E and the thereto-attached cages thereto by means of the hook H.

Should the cages be at any time suspended out of reach of the hand of a person desiring to use them, they can be readily drawn in toward the building by means of the hooked arm or rod S, which is grasped at the inner end by such person and pushed through the window until the cages or chains are reached, when the hook on said rod is engaged with either the cage or chains, and the rod pulled inward, by which means the cage can be brought within easy reach of the person in the building. This rod is provided at its inner end with an eye, by which it may be suspended from a nail near the window, so as to be readily accessible.

When the cages are not in use, the chains and other parts can be placed therein and the door closed, thus rendering the entire apparatus very compact, and removing all unsightly appendages.

Having thus described my invention, what I claim therein as new is—

1. A fire-escape having two fire-proof cages, A, each having a door, J, provided with gauze-covered aperture L, chain D, attached at its respective ends to the apex of each cage, chains I, connected to the upper portion, and chain K, connected to the bottom of each cage, substantially as and for the purpose set forth.

2. A fire-proof cage, A, having door J, provided with gauze-covered aperture L, substantially as and for the purpose set forth.

3. The combination, with the cages A A, provided with chains I and K and connecting-chain D, of link E, having sheave or pulley F and pivotal hook H, substantially as and for the purpose set forth.

4. An impervious fire-proof cage having bottom braces, B, rods C, and door J, provided with a gauze-covered aperture, L, substantially as set forth.

5. The combination, with the cages A A, provided with chains I and K and connecting-chain D, of link E, having sheave or pulley F and pivotal hook H, and grapple and cage-support N, consisting of bar P, having hook Q, with inturned end $f$, slotted dog R, wedge $g$, eye $h$, slot $i$, and sheave or roller $j$, and the arms O O, each having at its inner end a barb or hook, $e$, substantially as and for the purpose set forth.

In testimony whereof I affix my signature in presence of two witnesses.

AUGUST CONRAD BURGHARDT.

Witnesses:
CHAS. J. GOOCH,
E. P. HOUGH.